United States Patent [19]

Winchester

[11] Patent Number: 4,752,502

[45] Date of Patent: Jun. 21, 1988

[54] NITROCELLULOSE-URETHANE TRAFFIC PAINT

[75] Inventor: Charles M. Winchester, Landenberg, Pa.

[73] Assignee: Hercules Incorporated, Wilmington, Del.

[21] Appl. No.: 26,407

[22] Filed: Mar. 16, 1987

Related U.S. Application Data

[60] Continuation-in-part of Ser. No. 917,111, Oct. 8, 1986, abandoned, which is a division of Ser. No. 813,908, Dec. 27, 1985, abandoned.

[30] Foreign Application Priority Data

Dec. 16, 1986 [EP] European Pat. Off. ........ 86.117509.9

[51] Int. Cl.$^4$ ............................................... B05D 1/02
[52] U.S. Cl. .................................... 427/137; 427/426; 427/421
[58] Field of Search ..................... 427/137, 421, 426; 523/172; 260/998.19; 404/93, 94

[56] References Cited

U.S. PATENT DOCUMENTS

| | | | |
|---|---|---|---|
| Re. 28,531 | 8/1975 | de Vries | 427/137 |
| 3,136,733 | 6/1964 | Ross et al. | 523/172 |
| 3,474,057 | 10/1969 | de Vries | 260/22 |
| 3,962,397 | 6/1976 | Narui et al. | 264/144 |
| 4,025,476 | 5/1977 | Miller et al. | 523/172 |
| 4,031,048 | 6/1977 | Holmen et al. | 523/172 |
| 4,105,808 | 8/1978 | Mc Kenzie | 427/137 |
| 4,251,404 | 2/1981 | Simms | 525/54.22 |
| 4,255,298 | 3/1981 | Simms | 527/301 |
| 4,284,751 | 8/1981 | Hutt et al. | 528/45 |
| 4,293,596 | 10/1981 | Furendal et al. | 427/160 |

FOREIGN PATENT DOCUMENTS

| | | |
|---|---|---|
| 2640047 | 3/1977 | Fed. Rep. of Germany . |
| 2193361 | 2/1974 | France . |
| 81342 | 6/1979 | Japan . |
| 65772 | 4/1983 | Japan . |
| 142261 | 8/1984 | Japan . |
| 2092605 | 8/1982 | United Kingdom . |
| 2113234 | 8/1983 | United Kingdom . |

OTHER PUBLICATIONS

Hercules Incorporated, "Nitrocellulose-Urethane Super Laquers", Hercules Incorporated Technical Information Bulletin CSL-202E (May 1984).

*Primary Examiner*—Shrive P. Beck
*Attorney, Agent, or Firm*—Joanne W. Patterson

[57] ABSTRACT

Disclosed is a process for forming a paint marking on a roadway surface using a paint composition comprising (a) a paint vehicle comprising the reaction product of nitrocellulose, a polymeric hydroxyalkyl acrylate modifier, and an isocyanate resin as the binder, and a solvent, and (b) pigment in an amount sufficient to color the paint composition.

9 Claims, No Drawings

NITROCELLULOSE-URETHANE TRAFFIC PAINT

This application is a continuation-in-part of application Ser. No. 917,111, filed Oct. 8, 1986, now abandoned. Application Ser. No. 917,111 is a division of application Ser. No. 813,908, filed Dec. 27, 1985, now abandoned.

FIELD OF THE INVENTION

This invention relates to a solvent-based traffic paint composition having a short drying time as well as increased durability. This invention especially relates to a traffic paint composition formulated with a nitrocellulose-urethane vehicle.

BACKGROUND OF THE INVENTION

Traffic paints are classified by "auto-no-track-time", defined as the period of time after which a passenger car can pass over a freshly applied marking without tracking, i.e., without pick-up of material by a tire and redeposition of the material on the road surface with subsequent revolutions. Paints with a 90 second or less auto-no-track-time are preferred because they do not require placing cone barriers on the road to prevent motorists from driving over the wet paint. The placing and retrieval of the cones is costly and hazardous to the personnel handling the cones.

Paints that do not require coning are usually solvent-based, comprised of alkyd or chlorinated rubber vehicles. Under severe service conditions, however, such materials may have a useful life of six months or less. More durable marking materials generally are solventless systems and are based on epoxy or polyester resins, or hydrocarbon or rosin ester thermoplastic materials. Their service life when properly applied can approach three or more years.

However, polyester and epoxy liquid compositions have auto-no-track-times of 8–10 minutes and 10–15 minutes, respectively, and therefore require coning. Alternatively, a heavy application of glass beads (20–25 pounds versus a normal 6–8 pounds per gallon of material applied) can be used with epoxy resins to eliminate coning, but that significantly increases the cost. Thermoplastic hydrocarbon or rosin ester coatings dry quickly by cooling, but become soft in hot weather and require expensive application equipment.

Urethane coatings have long been used for exterior applications where high performance is required, e.g., for bridge paints and aircraft finishes. They have not been used commercially for durable traffic paints, however, because the freshly applied coating would remain wet too long due to slow solvent release.

It would be desirable to make available a traffic paint composition that has the durability provided by a nitrocellulose-urethane vehicle, while having a drying time short enough to permit its use without coning.

SUMMARY OF THE INVENTION

It has now been found that a solvent-based traffic paint composition formulated with a nitrocellulose-urethane vehicle has an auto-no-track time of 90 seconds or less and a durability superior to that of currently available solvent-based traffic paints.

The nitrocellulose-urethane paint composition of this invention for application onto a roadway surface comprises (a) a paint vehicle comprising the reaction product of nitrocellulose, an isocyanate resin, a polymeric hydroxyalkyl acrylate modifier, and, optionally, a plasticizer having —OH functional groups, as the binder, and a solvent, and (b) a pigment in an amount sufficient to color the paint composition. The composition may also comprise a catalyst to promote the reaction between the isocyanate and hydroxyl groups.

DETAILED DESCRIPTION OF THE INVENTION

Urethane coatings are formed by the reaction of isocyanate and polyol components. Commercially available nitrocellulose contains free hydroxyl groups that can react with resins containing isocyanate groups to form urethane linkages. In the paint compositions of this invention, a mixture of nitrocellulose, a polymeric hydroxyalkyl acrylate modifier (hereinafter referred to as a hydroxyacrylic resin) and optionally a plasticizer containing —OH functional groups is used as the polyol component of the urethane binder. The composition also comprises a solvent, a pigment and optionally a catalyst.

It is assumed that in these nitrocellulose-urethane paint compositions, the nonpolar character of the hydroxyacrylic resin facilitates the rapid release of the polar solvents used, which tend to be retained by polar polymers.

Preferably, the hydroxyacrylic resin modifiers are copolymers of a hydroxyethyl acrylate or methacrylate with an alkyl acrylate or methacrylate such as the methyl, ethyl or butyl derivative. In general the higher molecular weight hydroxyacrylic resins (normally having molecular weights on the order of about 1000) provide harder, more brittle films. It may be advantageous to use a mixture of two or more hydroxyacrylic resin modifiers.

Lower molecular weight hydroxyacrylic resins act as plasticizers and give softer, more flexible films, and higher coatings solids. Other plasticizers that are conventionally employed in lacquer formulations can be used in the composition of this invention, but only those that have reactive —OH functional groups, e.g., castor oil-azelaic acid alkyds and polyethers derived from propylene glycol.

Nitrocellulose is compatible with both aromatic and aliphatic isocyanate resins. These resins are low molecular weight polyisocyanates and are available commercially. Aliphatic isocyanate resins are usually preferred over aromatic isocyanate resins for exterior applications because the aromatic resins yellow upon exposure to ultraviolet light. However, since requirements for color stability in traffic paints are not as stringent as in other exterior applications, the aromatic resins can be used in combination with aliphatic isocyanate resins. Aromatic resins are cheaper and cure faster than aliphatic isocyanate resins.

Suitable aliphatic isocyanate resins include, but are not limited to, hexamethylene diisocyanate biurets, trimers of hexamethylene diisocyanate, and isophorone diisocyanate trimers.

Suitable aromatic isocyanate resins include, but are not limited to, trimers of toluene diisocyanate, adducts of toluene diisocyanate with polyols such as trimethylol propane, and diphenylmethane diisocyanate resins.

Nitrocellulose useful in the paint compositions of this invention has an average nitrogen content of about 10.7 to about 12.2%. Suitable viscosity grades of nitrocellulose include, but are not limited to, ¼ sec, ½ sec and 5–6 sec. The viscosity is measured by the falling-ball method at 25° C. Higher viscosity grades, such as ½ sec or 5–6 sec, give lower coating solids and thinner dry films at the same wet film thickness application. Lower viscosity grades, i.e., 30–35 cps and 18–25 cps, give higher solids. An ultra low viscosity grade (5 cps) gives a much longer no-track-time.

Urethane grade nitrocellulose (toluene wet nitrocellulose with a maximum water content of 3%) as well as toluene wet nitrocellulose with a maximum water content of 4%, or alcohol wet nitrocellulose, can be used in the paint compositions of this invention.

Suitable and preferred ranges for the components of the nitrocellulose-urethane binder of the paint composition of this invention are given below.

|  | Molar Equivalents | |
| --- | --- | --- |
|  | Suitable | Preferred |
| Nitrocellulose | .2–.9 OH | .5–.8 OH |
| Hydroxyacrylic resin | .1–.8 OH | .2–.5 OH |
| Hydroxyfunctional plasticizer | 0–.4 OH | 0–.3 OH |
| Isocyanate resin | .75–1.25 NCO | .85–1.15 NCO |
| Ratio NCO/OH | .75/1.0 to 1.15/1.0 | .85/1.0 to 1.0/1.0 |

The paint compositions of this invention are typically formulated to maintain molar equivalents of isocyanate and hydroxyl group functionality or a slight excess of hydroxyl to ensure complete reaction of the isocyanate groups. Ratios with an excess of isocyanate exhibit slower drying rates.

A catalyst is preferably used to promote the reaction between the isocyanate and hydroxyl groups, particularly when the paint is applied to cold road surfaces. Any catalyst commonly employed in urethane coating systems can be used, e.g., bismuth 2-ethyl hexanoate and dibutyl tin dilaurate. Bismuth 2-ethyl hexanoate is preferred. Zinc, tin and cobalt driers are also effective. The catalyst does not appear to affect the no-pick-up-time at the level used.

Any conventional pigment, or combination of pigments, suitable for traffic paints may be used. A combination of calcium carbonate, talc and titanium dioxide is preferred for the white paints of the present invention. If yellow paints are desired, yellow pigments such as diarylide yellow toner or lead chromate can be used.

The paint compositions of this invention can be formulated at a pigment volume concentration (PVC) between about 15 and the critical PVC of the composition. The critical PVC is defined as that level of pigmentation in the dry paint where just sufficient binder is present to fill the voids between the pigment particles. Above the critical PVC there is a rapid fall-off in durability. A PVC of about 40 is preferred. For a given vehicle system the higher the PVC, the faster the dry and the higher the solids.

Polar solvents from which moisture, acids, alcohols, amines and all materials containing reactive hydrogen have been eliminated are used in the paint composition. Esters and ketones are recommended. Methyl ethyl ketone is preferred.

The presence of the solvent provides better wetting of the road surface with varying types and degrees of contamination (dirt, oil, ethylene glycol, rubber). This improved wetting of the road surface eliminates the necessity for the application of a primer or precleaning of the road surface, steps that are required when using some currently available durable marking materials.

The paint compositions of this invention can be formulated for use in either single-stream or two-stream equipment and for both airless and air-assisted application. The compositions can be applied at ambient temperature or can be heated before application. Two-stream equipment is preferred. Heating before application will reduce the auto-no-track-time, generally to less than 90 seconds.

If single-stream equipment is used, the polyol component containing the pigment, the isocyanate resin component and the catalyst component are stored separately and are not mixed until shortly before application of the composition to the roadway.

If two-stream equipment is used, the polyol component, which also contains the pigment and catalyst, and the isocyanate resin component are stored in separate containers until use. The two components do not mix until they reach the application nozzle.

In either case it may be advantageous to add an anti-settling agent to the polyol component. The antisettling agent keeps the pigment in suspension when the polyol component is stored for an extended period of time before use.

After the paint compositions of this invention are sprayed onto the road surface, glass beads or spheres can be immediately dropped onto the paint while it is still tacky so that the beads become partially embedded in the paint. The resulting line is immediately retroreflective. Conventional application equipment includes a spray head for the paint composition having a glass bead dispensing device associated therewith and positioned just behind the paint spray head. The glass bead dispensing device is coordinated with the paint spray head to supply glass beads to the freshly applied, undried paint line passing under the glass bead dispenser, or to intermix the paint and glass just before or as the paint hits the road surface.

The following examples are illustrative of the invention and are not intended to limit its scope in any way. All parts and percentages are by weight unless otherwise specified.

DURABILITY COMPARISON

This series of tests illustrates the durability of nitrocellulose-urethane traffic paints compared with that of various conventional traffic paint compositions.

In the composition described below the nitrocellulose contributes 0.35 equivalent OH, the hydroxyfunctional resin 0.39 equivalent OH, the hydroxyfunctional plasticizer 0.26 equivalent OH and the isocyanate resin 1.11 equivalents NCO to the binder. The pigment volume concentration is 40. This composition does not contain the hydroxyalkyl acrylate modifier that is believed to facilitate rapid solvent release.

| Component A | Weight % |
| --- | --- |
| Saturated polyester resin with an average equivalent weight of 522 OH, a viscosity of 2400–7000 cps @ 25° C., 75% solids in ethyl glycol acetate | 9.36 |
| Castor oil-azelaic acid alkyd with an equivalent weight of 807 OH, a viscosity of 625 cps @ 25° C., 60% solids in toluene | 9.68 |
| Methyl ethyl ketone | 13.76 |
| Nitrocellulose with 11.8–12.2% nitrogen, an approximate equivalent weight of 594 OH, a viscosity of 4–5 seconds @ 25° C. (measured at 25% solids in a mixture of 25 wt % denatured ethyl alcohol, 55% toluene and 20% ethyl acetate | 9.68 |

-continued

| Component A | Weight % |
|---|---|
| as the solvent, ASTM D301-72), 60% solids wet with toluene | |
| Calcium carbonate | 13.90 |
| Talc | 16.77 |
| Methyl ethyl ketone | 7.68 |
| Titanium dioxide | 19.17 |
| | 100.00 |

The first three ingredients are combined, and the nitrocellulose is added slowly with slow mixing. The mixing is continued until the nitrocellulose is dissolved. The calcium carbonate and talc are dispersed in the nitrocellulose solution using a high speed disperser. After the remaining methyl ethyl ketone is added, the titanium dioxide is also dispersed at high speed.

| Component B | |
|---|---|
| Hexamethylene diisocyanate biuret with an average equivalent weight of 255 NCO, a viscosity of 11,500 mPa's at 20° C., 75% solids in a 1/1 mixture of butyl acetate/xylene as the solvent | 76.6 |
| Methyl ethyl ketone | 23.4 |
| | 100.00 |
| Component C | |
| Dibutyl tin dilaurate | 10.0 |
| Methyl ethyl ketone | 90.0 |
| | 100.0 |

Components A (polyol plus pigment), B (isocyanate resin), and C (catalyst) are stored separately until use. Immediately before application the following mix is made:

| Component A | 10,943 gms |
|---|---|
| Component B | 1,883 gms |
| Component C | 15.74 gms |
| | 12.841.74 gms |

The paint is applied at ambient temperature to a Portland cement concrete highway at 15 mils wet film thickness using conventional one stream spray equipment for traffic paint. This application was part of a road test conducted by a state highway department in accordance with ASTM D-713, Standard Practice for Conducting Road Service Tests on Traffic Paint.

The results of this road test are shown in Table 1 where A is a solvent based nitrocellulose-urethane paint composition that is formulated according to the invention, except that the modifier is a conventional modifier for nitrocellulose-urethane lacquers; B is a chlorinated rubber paint conforming to New Jersey Department of Transportation specifications for Type IV traffic paint (this paint is recognized throughout the industry as the most durable traffic paint currently available); C and D meet Commonwealth of Pennsylvania specifications, including a 90-second auto-no-track-time; and E meets the specifications of the State of South Carolina, including a 60-second auto-no-track-time.

TABLE 1

| Weeks Exposure | Retroreflectance (%)* | | | | |
|---|---|---|---|---|---|
| | A | B | C | D | E |
| 0 | 94.9 | 82.6 | 94.0 | 98.5 | 83.0 |
| 4 | 87.3 | 66.4 | 69.5 | 69.5 | 60.8 |
| 16 | 69.9 | 59.4 | 58.8 | 57.6 | 38.5 |
| 20 | 85.6 | 69.8 | 65.1 | 56.3 | 34.9 |

TABLE 1-continued

| Weeks Exposure | Retroreflectance (%)* | | | | |
|---|---|---|---|---|---|
| | A | B | C | D | E |
| 27 | 60.4 | 41.2 | 25.1 | 21.9 | 20.9 |
| 34 | 51.1 | 34.4 | 20.6 | 18.8 | 19.0 |

*Values given in the table represent the percent of the standard as measured with a Michigan retroreflectometer.

EXAMPLE 1

This example illustrates the efficacy of nitrocellulose in reducing the drying time of the traffic paint compositions of this invention.

In the following formulations labeled 1A and 1C, the nitrocellulose provides 0.5 equivalent OH, the hydroxyacrylic resin provides 0.3 equivalent OH, the hydroxyfunctional plasticizer 0.2 equivalent OH, and the isocyanate resin 1.0 equivalent NCO. In formulations 1B and 1D, the nitrocellulose in formulations 1A and 1C has been replaced by additional hydroxyacrylic resin on an equivalent basis. Hence, 1B and 1D each contain 0.8 equivalent OH of hydroxyacrylic resin, 0.2 equivalent OH of hydroxyfunctional plasticizer and 1.0 equivalent NCO of isocyanate resin. All of the formulations have a pigment volume concentration of 40.

| | Weight % | | | |
|---|---|---|---|---|
| | 1A | 1B | 1C | 1D |
| Nitrocellulose (same as Durability Comparison) | 11.30 | — | 11.94 | — |
| Hydroxyacrylic resin "X" (1) | 11.53 | 24.47 | — | — |
| Hydroxyacrylic resin "Y" (2) | — | — | 10.15 | 23.04 |
| Hydroxyfunctional plasticizer (3) | 3.63 | 2.90 | 3.83 | 3.28 |
| Methyl ethyl ketone | 23.79 | 23.14 | 24.09 | 23.71 |
| Calcium carbonate | 11.78 | 12.12 | 11.73 | 12.03 |
| Talc | 14.23 | 14.64 | 14.18 | 14.54 |
| Titanium dioxide | 16.27 | 16.72 | 16.20 | 16.62 |
| Catalyst solution (4) | .24 | .24 | .24 | .24 |
| Isocyanate resin (5) | 7.23 | 5.77 | 7.64 | 6.54 |
| TOTAL | 100.00 | 100.00 | 100.00 | 100.00 |

(1) Hydroxyacrylic resin "X" has an equivalent weight of 1032 OH, a viscosity of 6000 cps @ 25° C., 58% solids in xylene.
(2) Hydroxyacrylic resin "Y" has an equivalent weight of 833 OH, 5000 mPa's dynamic viscosity @ 20° C., 60% solids in a 4/1 mixture of xylene/butyl acetate as the solvent.
(3) The hydroxyfunctional plasticizer is a castor oil-azelaic acid alkyd with an equivalent weight of 484 OH, a viscosity of approximately 70,000 cps @ 23° C., 100% solids.
(4) The catalyst solution is bismuth 2-ethyl hexanoate, 8.2% metal as supplied, 10% solution in methyl ethyl ketone.
(5) The isocyanate resin is a hexamethylene diisocyanate biuret with an average equivalent weight of 191 NCO, a viscosity of 11,500 ± 3,500 mPa's at 20° C., 100% solids.

Each mix is made in a container with glass beads as a grinding medium. The polyol portion of each is tumbled overnight. The pigments and catalyst are added and the mixes tumbled again overnight to disperse the pigments. The isocyanate resin is added and the containers are agitated for 10 minutes. The resulting paints are immediately separated from the grinding medium and films are cast on a glass plate to give 15 mils wet film thickness. No-pick-up-times are determined for each according to ASTM D-711, Method for No-Pick-Up-Time of Traffic Paint. This method is a laboratory test for comparing the length of time after application after which there is no pick-up of traffic or pavement marking paint by the tire of an automobile. The results are as follows:

| | ASTM D-711 No-Pick-Up-Time, Min. |
|---|---|
| Formula 1A with nitrocellulose | 3 |
| Formula 1B without nitrocellulose | 25 |
| Formula 1C with nitrocellulose | 1 |
| Formula 1D without nitrocellulose | 25 |
| Durability Comparison (with nitrocellulose but without hydroxyacrylic resin) | 26 |

EXAMPLE 2

In this example the nitrocellulose provides 0.5 equivalent OH, the hydroxyacrylic resin 0.3 equivalent OH, the hydroxyfunctional plasticizer 0.2 equivalent OH, and the isocyanate resin 1.0 equivalent NCO. The pigment volume concentration is 40.

| | Weight % |
|---|---|
| Component A | |
| Nitrocellulose (same as in Durability Comparison) | 11.95 |
| Hydroxyacrylic resin "Y" (same as Example 1C and 1D) | 10.16 |
| Hydroxyfunctional plasticizer (same as Example 1) | 3.84 |
| Calcium carbonate | 11.74 |
| Talc | 14.18 |
| Titanium dioxide | 16.21 |
| Catalyst solution (same as Example 1) | .25 |
| Methyl ethyl ketone | 31.67 |
| | 100.00 |
| Component B | |
| Isocyanate resin (same as Example 1) | 61.30 |
| Methyl ethyl ketone | 38.70 |
| | 100.00 |

In preparing Component A, the nitrocellulose is dissolved in methyl ethyl ketone to form a base solution of about 33% solids. The pigments are dispersed in a blend of the nitrocellulose solution, the hydroxyacrylic resin, the plasticizer, and the catalyst on a high speed disperser. The remaining methyl ethyl ketone is then added.

The paint is applied at ambient temperature at 15 mils wet film thickness on a Portland cement concrete highway using conventional spray equipment modified to preblend six parts by volume of Component A (polyol plus pigment and catalyst) from one stream with one part by volume of Component B (isocyanate resin) from a second stream. A test conducted in accordance with ASTM D-713, Standard Practice for Conducting Road Service Tests on Traffic Paint, shows this paint to have an auto-no-track-time of less than 90 seconds.

EXAMPLE 3

In this example the pigment volume concentration and the OH and NCO equivalents contributed by the various components of the composition are the same as in Example 2. An antisettling agent is added to Component A and a polyether derived from propylene glycol is used as the hydroxyfunctional plasticizer. A trimer of hexamethylene diisocyanate is used in Component B.

| | Weight % |
|---|---|
| Component A | |
| Nitrocellulose (same as in Durability Comparison) | 12.30 |
| Hydroxyacrylic resin "Y" (same as Example 1C and 1D) | 10.46 |
| Polyoxypropylene derivative of propylene glycol with a molecular weight of 1050, hydroxyl value 107 mg KOH/g, viscosity 150 cps @ 25° C., 100% solids | 4.27 |
| Calcium carbonate | 12.30 |
| Talc | 14.86 |
| Titanium dioxide | 16.98 |
| Antisettling agent - organic derivative of a hydrous silicate mineral, i.e., organoclay | .20 |
| Catalyst (same as Example 1) | .26 |
| Methyl ethyl ketone | 28.37 |
| | 100.00 |
| Component B | |
| Trimer of hexamethylene diisocyanate with an average equivalent weight of 216 NCO, a viscosity of 700 mPa's at 23° C., 90% solids in a 50/50 mixture of "Aromatic 100" (Exxon)/butyl acetate as the solvent | 62.70 |
| Methyl ethyl ketone | 37.30 |
| | 100.00 |

In preparing Component A, the nitrocellulose is dissolved in methyl ethyl ketone to form a base solution of about 33% solids. The pigments and antisettling agent are dispersed in a blend of the nitrocellulose solution, the hydroxyacrylic resin, the plasticizer, and the catalyst on a high speed disperser. The remaining methyl ethyl ketone is then added.

The paint is applied at ambient temperature at 15 mils wet film thickness on a Portland cement concrete highway using conventional spray equipment modified to preblend six parts by volume Component A (polyol plus pigment and catalyst) from one stream with one part Component B (isocyanate resin) from a second stream. A test conducted in accordance with ASTM D-713 shows this paint to have an auto-no-track-time of 90 seconds.

EXAMPLE 4

White traffic paint compositions are prepared as follows. In this example the OH and NCO equivalents contributed by the various components of the composition are the same as in Example 2. An alternative pigmentation for a white traffic paint is illustrated in Example 4A. The pigment volume concentration is 17 for Example 4A and 40 for Example 4B.

| | Weight % 4A | Weight % 4B |
|---|---|---|
| Component A | | |
| Nitrocellulose (same as in Durability Comparison) | 16.68 | 11.50 |
| Hydroxyacrylic resin "X" (same as Examples 1A and 1B) | 17.02 | 11.73 |
| Hydroxyfunctional plasticizer (same as Example 1) | 5.35 | 3.69 |
| Calcium carbonate | none | 11.98 |
| Talc | none | 14.48 |
| Titanium dioxide | 24.02 | 16.55 |
| Catalyst solution (same as Example 1) | .36 | .25 |
| Methyl ethyl ketone | 36.57 | 29.82 |
| | 100.00 | 100.00 |
| Component B | | |
| Isocyanate resin (same as Example 1) | 73.20 | 63.00 |
| Methyl ethyl ketone | 26.80 | 37.00 |
| | 100.00 | 100.00 |

In preparing Component A the nitrocellulose solution is dissolved in methyl ethyl ketone to form a base solution of about 33% solids. The pigment is dispersed in a blend of the nitrocellulose solution, the hydroxyacrylic resin, the plasticizer, and the catalyst on a high speed disperser. The remaining methyl ethyl ketone is then added.

The paints are applied using the same procedure as in Example 3. Satisfactory auto-no-track-times are obtained. A control white paint conforming to New Jersey Type IV specifications applied at ambient paint temperature on the same highway on the same day using conventional spray equipment failed the auto-no-track-time requirement at 180 seconds.

EXAMPLE 5

Yellow traffic paint compositions are prepared as follows. In this example the pigment volume concentration and the OH and NCO equivalents contributed by the various components of the composition are the same as in Example 2. Example 5A is a lead-free yellow paint composition.

|  | Weight % | |
| --- | --- | --- |
|  | 5A | 5B |
| Component A | | |
| Nitrocellulose (same as in Durability Comparison) | 11.68 | 11.40 |
|  | 11.68 | 11.40 |
| Hydroxyacrylic resin "X" (same as Examples 1A and 1B) | 11.92 | 11.63 |
| Hydroxyfunctional plasticizer (same as Example 1) | 3.75 | 3.66 |
| Calcium carbonate | 11.33 | 15.80 |
| Talc | 10.25 | 10.51 |
| Titanium dioxide | 15.10 | 10.88 |
| Diarylide yellow toner | 3.43 | none |
| Lead chromate (medium shade) | none | 5.16 |
| Antisettling agent (same as Example 3) | none | .20 |
| Catalyst solution (same as Example 1) | .25 | .25 |
| Methyl ethyl ketone | 32.29 | 30.51 |
|  | 100.00 | 100.00 |
| Component B | | |
| Isocyanate resin (same as in Example 1) | 57.50 | 60.97 |
| Methyl ethyl ketone | 42.50 | 39.03 |
|  | 100.00 | 100.00 |

The paints are prepared and applied using the same procedure as in Example 4. Satisfactory auto-no-track-times are obtained.

What I claim and desire to protect by Letters Patent is:

1. A process for forming a paint marking on a roadway surface comprising
   (a) forming a paint composition by mixing, in a closed system, a solution comprising from about 0.2 to about 0.9 OH molar equivalents nitrocellulose and from about 0.1 to about 0.8 OH molar equivalents hydroxyacrylic resin with a solution comprising from about 0.75 to about 1.25 NCO molar equivalents isocyanate resin at an NCO/OH ratio of from about 0.75/1.0 to about 1.15/1.0, and an amount of pigment sufficient to color said paint composition,
   (b) releasing said composition through a spray nozzle, and
   (c) directing the spray onto a roadway surface.

2. The process of claim 1 wherein the hydroxyacrylic resin is a copolymer of a hydroxyalkyl acrylate or methacrylate with an alkyl acrylate or methacrylate.

3. The process of claim 1 wherein the isocyanate resin is a hexamethylene diisocyanate biuret, a trimer of hexamethylene diisocyanate or a diphenylmethane diisocyanate resin.

4. The process of claim 1 wherein the mixing takes place in the presence of a catalyst to promote the reaction between the isocyanate and hydroxyl groups.

5. The process of claim 1 wherein the paint composition is heated to a temperature above ambient temperature and below the temperature at which said paint composition decomposes, before application to the roadway surface.

6. The process of claim 1 wherein the solution of nitrocellulose and hydroxyacrylic resin also comprises up to about 0.4 OH equivalents of a plasticizer having —OH functional groups.

7. The process of claim 6 wherein the plasticizer having —OH functional groups is a castor oil-azelaic acid alkyd resin.

8. The process of claim 6 wherein the plasticizer having —OH functional groups is a polyether derived from propylene glycol.

9. The process of claim 6 wherein the mixing takes place in the presence of a catalyst to promote the reaction between the isocyanate and hydroxyl groups.

* * * * *